(12) United States Patent
Lais et al.

(10) Patent No.: US 8,539,996 B2
(45) Date of Patent: Sep. 24, 2013

(54) DOCKING DEVICE COMPRISING TWO COUPLING CLOSURES FOR THE ENVIRONMENTALLY SEALED TRANSFER OF BULK MATERIAL, HAVING AT LEAST ONE LOCKING UNIT

(75) Inventors: Peter Lais, Muellheim (DE); Martin Koch, Neuenburg-Grissheim (DE)

(73) Assignee: GEA Pharma Systems AG, Bubendorf (CH)

(*) Notice: Subject to any disclaimer, the term of this patent is extended or adjusted under 35 U.S.C. 154(b) by 635 days.

(21) Appl. No.: 12/680,555

(22) PCT Filed: Sep. 9, 2008

(86) PCT No.: PCT/DE2008/001509
§ 371 (c)(1),
(2), (4) Date: Oct. 29, 2010

(87) PCT Pub. No.: WO2009/039823
PCT Pub. Date: Apr. 2, 2009

(65) Prior Publication Data
US 2011/0088353 A1    Apr. 21, 2011

(30) Foreign Application Priority Data
Sep. 28, 2007    (DE) .................... 20 2007 013 676 U

(51) Int. Cl.
*B65B 3/04*    (2006.01)
*B65B 1/04*    (2006.01)

(52) U.S. Cl.
USPC .................. 141/383; 137/614.04; 137/614.06

(58) Field of Classification Search
USPC ........ 141/383–386; 137/614, 614.01–614.06
See application file for complete search history.

(56) References Cited

U.S. PATENT DOCUMENTS

| 5,150,735 A | 9/1992 | Bandy |
| 5,295,507 A | 3/1994 | Bandy |

(Continued)

FOREIGN PATENT DOCUMENTS

| DE | 20014871 U1 | 2/2001 |
| DE | 29915973 U1 | 3/2001 |

(Continued)

OTHER PUBLICATIONS

International Search Report mailed Mar. 10, 2009, issued in corresponding International Application No. PCT/DE2008/001509, filed Sep. 9, 2008, 4 pages.

*Primary Examiner* — Gregory Huson
*Assistant Examiner* — Nicolas A Arnett
(74) *Attorney, Agent, or Firm* — Christensen O'Connor Johnson Kindness PLLC

(57) ABSTRACT

A docking device for transferring the contents of, filling, and/or emptying containers comprises first and second coupling latches positioned flush to one another along respective closing sides thereof. A locking unit is configured for locking together pipe nozzles of the first and second coupling latches. The locking unit includes at least one movable first arresting element that is present in a passage that has an opening to an exterior of the second coupling latch, and is configured to interact with a corresponding second arresting element present on an exterior of the pipe nozzle of the second coupling latch. The docking device further comprises a bolt that is movable in a cylinder. The bolt has a first section with a first diameter, a second section with a second diameter that is smaller than the first diameter, and a third transfer section between the first and second section with a tapering diameter.

17 Claims, 2 Drawing Sheets

(56) References Cited

U.S. PATENT DOCUMENTS

| | | | |
|---|---|---|---|
| 5,507,313 A * | 4/1996 | LeDevehat | 137/614.05 |
| 5,540,266 A * | 7/1996 | Grau et al. | 141/383 |
| 5,690,152 A * | 11/1997 | Koch et al. | 141/346 |
| 5,718,270 A * | 2/1998 | Grau et al. | 141/383 |
| 5,794,647 A * | 8/1998 | Denmark et al. | 137/315.24 |
| 6,315,013 B1 * | 11/2001 | Lardieri | 141/383 |
| 6,807,979 B2 | 10/2004 | Koch | |
| 6,913,048 B2 | 7/2005 | Koch | |
| 6,945,273 B2 * | 9/2005 | Reid | 137/614.06 |
| 7,104,293 B2 * | 9/2006 | Lais et al. | 141/302 |
| 7,398,804 B2 | 7/2008 | Koch | |
| 7,487,808 B2 * | 2/2009 | Stoye et al. | 141/315 |
| RE42,552 E * | 7/2011 | Reid | 137/614.06 |
| 2002/0158086 A1 * | 10/2002 | Pieri | 222/390 |
| 2004/0094211 A1 | 5/2004 | Koch | |
| 2004/0099335 A1 | 5/2004 | Koch | |
| 2005/0084181 A1 | 4/2005 | Koch | |
| 2010/0084049 A1 * | 4/2010 | Smith et al. | 141/383 |
| 2010/0126622 A1 * | 5/2010 | Koch et al. | 141/1 |
| 2012/0111443 A1 * | 5/2012 | Untch | 141/1 |

FOREIGN PATENT DOCUMENTS

| | | |
|---|---|---|
| DE | 20117669 U1 | 4/2002 |
| EP | 0554096 A1 | 8/1993 |
| EP | 01083137 A1 | 3/2001 |
| EP | 01313658 B1 | 5/2003 |
| EP | 01315662 B1 | 6/2003 |
| EP | 1749770 A2 * | 2/2007 |
| WO | 02/18247 A1 | 3/2002 |
| WO | 02/18248 A1 | 3/2002 |

* cited by examiner

DOCKING DEVICE COMPRISING TWO COUPLING CLOSURES FOR THE ENVIRONMENTALLY SEALED TRANSFER OF BULK MATERIAL, HAVING AT LEAST ONE LOCKING UNIT

FIELD

The present application relates to a docking device for refilling, filling, and/or emptying of containers.

BACKGROUND

For contamination-free transfer of bulk goods such as from interim or end products, in particular in the pharmaceutical or food industry, suitable docking devices such as those described in EP 1 083 137 A1, EP 1 315 662 A1, EP 1 313 658 A1, and EP 554 096 A1 are increasingly used. The systems used for this purpose are based on the use of two coupling latches which are equipped with so-called (circular) semi or closing flaps, which when brought into contact with each other can be rotated around a shared axis, while the transfer channel is released or locked. In order to achieve a particularly high degree of freedom from contamination, it is not only important that the closing flaps present in the pipe nozzles guarantee a completely sealed locking, but also that the coupling latches that form the docking device are connected to each other in a firm and in particular, sealed manner during the entire transfer procedure. In particular, during the transfer of bulk goods, the docked-on state of the two coupling latches may not be lifted, including from external mechanical influences or by the transfer of bulk goods itself. For this purpose, locking units are regularly provided which firmly press together the pipe nozzles of the coupling latches which form the docking device or their seals, and hold them in this position for the entire duration of the transfer of the bulk goods. For example, according to an embodiment variant known from the prior art, the docked-on coupling latches can be bolted together. Furthermore, for example, bayonet latches can be provided which can be operated hydraulically.

The locking systems for the above-named docking devices which are known from the prior art are either cumbersome and time-intensive to operate, or technically complex. A further disadvantage is that locking units for docking devices known from the prior art are "propped on" as external components, and accordingly are not protected against damage while the coupling latches or the docking device are being handled.

It would therefore be desirable to be able to resort to locking units for docking devices which do not suffer from the disadvantages of the prior art, and which furthermore guarantee on a sustained basis a reliable and safe transfer of bulk goods.

SUMMARY AND INITIAL DESCRIPTION

For this reason, the present disclosure illustrates and describes docking devices containing at least one locking unit, which do not suffer from the disadvantages of the prior art and which in particular can be reliably operated in continuous operation, which offer no contact surfaces for external damage, and which reversibly connect to each other the coupling latches which form the docking device in a technically simple manner, while at the same time with a reliable seal.

Accordingly, in at least one embodiment, a docking device for refilling, filling, and/or emptying of containers has been found (also referred to as the first embodiment of the device), comprising first and second coupling latches that can be laid or which lie flush with each other along respective latch sides, wherein each of the first and second coupling latches include a pipe nozzle, and wherein the docking device is equipped with at least one locking unit configured for locking the pipe nozzles of the first and second coupling latches. The at least one locking unit includes at least one movable first arresting element that is present in a passage that has an opening to an outer side of the second coupling latch, in one embodiment in the form of a ball, which is configured to interact with a corresponding second arresting element that is present on an outer side of the pipe nozzle of the second coupling latch, and a bolt that is movable in a cylinder with a first section with a first diameter, a second section with a second diameter that is smaller than the diameter of the first section, and if appropriate, a third transfer section between the first and the second section with a tapering diameter. The passage opens out to the outer side of the second coupling latch and into the cylinder and is of a length that is less than a diameter of the first arresting element, so that when a side surface of the first section is in contact with the movable first arresting element, the moveable first arresting element interacts with the corresponding second arresting element on the outer side of the pipe nozzle of the second coupling latch, while locking the first and second coupling latch. When the movable first arresting element is adjacent to a side surface of the second or if appropriate, the third section of the bolt, the pipe nozzles of the first and second coupling latches are no longer lockable or are not locked against each other.

The present disclosure also illustrates and describes a docking device for refilling, filling, and/or emptying of containers (also referred to as the second embodiment of the invention), comprising first and second coupling latches which can be laid or which lie flush with each other along respective latch sides, wherein the first and/or second coupling latch, in one embodiment on its outer side, has at least one centering pin, the other of the second or first coupling latch, in one embodiment on its outer side, has at least one centering opening that corresponds to the centering pin, which when they grip each other, the first and second coupling latches in a coupled state. The docking device is equipped with at least one locking unit configured for locking the pipe nozzles of the first and second coupling latch, comprising, in at least one centering pin of the first and/or second coupling latch, (a) at least one first movable arresting element that is present in a passage that has an opening towards an outer side of the centering pin, in one embodiment in the form of a ball, configured for form-fit, locking interaction with the centering opening, in one embodiment with the edge of the centering opening, of the corresponding second or first coupling latch, and (b) a bolt that is movable at least in sections in a cylinder present in the centering pin, wherein the bolt has a first section with a first diameter, a second section with a second diameter that is smaller than the diameter of the first section, and if appropriate, a third transfer section between the first and the second section with a tapering diameter the passage opens out to the outer side of the centering pin and into the cylinder and is of a length that is less than the diameter of the first arresting element, so that when a side surface of the first section is in contact with the movable first arresting element, the first arresting element interacts with the centering opening, in one embodiment with the edge of the centering opening of the second or first coupling latch, while locking the first and second coupling latch. When the movable first arresting element is adjacent to a side surface of the second or if appropriate, the third section of the bolt, the pipe nozzles from the first and second coupling latch are no longer lockable or are not locked to each other.

According to a further development of this second embodiment of a docking device, when the side surface of the first section of the bolt is in contact with the movable first arresting element, the first arresting element interacts with the centering opening of the second coupling latch in such a manner while locking the first and second coupling latch that the first arresting element interacts with a corresponding second arresting element that is present in and/or on a wall, in one embodiment on the inner side, of the centering opening of the second coupling latch, locking together the first and the second coupling latches, in one embodiment in a form-fit manner.

With both the first and the second embodiment described above, the first and second coupling device can in each case be equipped with a latch side and a container side, and in each case comprise a pipe nozzle and a closing flap that is supported around an axis in said pipe nozzle in such a manner that the closing flap can be pivoted. The closing flap contains an outer side that faces the latch side in the closed position, wherein on at least one side, in one embodiment on both sides, the closing flap is present along the axis with a partial shaft or partial shaft stump in an open position facing the latch side in each case. The partial shafts or partial shaft stumps of the first coupling latch are configured to form a shaft or a shaft stump when in contact with complementary partial shafts or partial shaft stumps of the second coupling latch, wherein the outer sides of the closing flaps of the first and second coupling latches rest on each other or can be brought to rest on each other. When resting on each other, the closing flaps can be reversibly pivoted around a shared axis into an open position out of a closing position in which they close the transfer channel that is formed by the pipe nozzle of the first coupling latch and the pipe nozzle of the second coupling latch.

Suitable docking devices and coupling latches are, for example, those described in EP 1 083 137 A1, EP 1 315 662 A1, EP 1 313 658 A1, and EP 554 096 A1, to the extent that these comprise a locking unit which is provided for the docking device according to the present disclosure. The docking device according to the present disclosure thus also comprises docking systems that are based on the use of so-called butterfly valves.

The first arresting element of the locking unit may be a ball. This first arresting element can naturally also be formed from two or more movable units, e.g., balls, that are connected to each other or that interact with each other. The second arresting element on the outer side of the pipe nozzle may be designed in such a manner that it interacts with the movable first arresting element in such a manner that a movement invariant second coupling latch results. For example, the second arresting element can be a protrusion on the outer side of the pipe nozzle which, if appropriate, runs around the circumference. In addition or as an alternative, an inlet or recess in the outer wall of the pipe nozzle, into which the movable first arresting element grips, in one embodiment in a flush manner, in order to thus affix the second coupling latch.

According to a further embodiment, the docking device has two or more locking units that are essentially arranged opposite each other with respect to the first and second coupling latches. The locking units are sufficient on a regular basis for a reliable locking of two coupling latches of a docking device. The locking units are in a fixed position or can be brought into a fixed position relative to the locking coupling latches, so that, e.g., an unlocking as a result of simple displacement or repositioning to the side of the locking units or coupling latches is prevented.

Docking devices according to the present disclosure can furthermore comprise a docking platform, also referred to as a docking working platform. This is generally a ring-shaped structure or housing with an inner diameter that is slightly larger than that of the coupling latches, and into which the first coupling latch of the docking device can be inserted or suspended. A docking platform of this type accordingly has support plates or collars for the coupling latch or docking device. The docking platforms used here accordingly preferably comprise at least one, in one embodiment at least two, locking unit as described above.

The pipe nozzle of the first coupling latch may be equipped on its outer side with a third arresting element for resting on or arresting with a fourth arresting element of the locking unit or of a docking platform, e.g., in the form of a support plate. The distance between the second and the third arresting element of the second or first coupling latches are preferably set in such a manner that when the fourth arresting element is placed onto or interacts with the third arresting element, the first arresting element interacts with the second arresting element in such a manner that the first and the second coupling latches are in a fixed position in relation to each other.

According to an embodiment of a docking device described herein, the locking unit comprises a ball locking bolt device, or represents such a device.

Suitable docking devices can, for example, be based on the use of two coupling latches, with which one takes the form of a support plate, a so-called active flap, and the other takes the form of a so-called passive flap. Coupling latches are regularly referred to as active flaps when the coupling latch is connected or is connectable to a drive for a rotatably supported closing flap. Passive flaps consequently comprise such coupling latches that are not equipped with a drive of this type. Coupling latches in the form of passive flaps or their closing flaps are moved around a shared axis when resting on each other, or when in a coupled state by the closing flap of the active flap that is in contact with them.

Alternatively, the docking device may also be formed from two coupling latches in the form of active flaps, i.e., both coupling latches are separately connected to a rotary drive in each case.

According to a further embodiment, the partial shafts or partial shaft stumps of the first and the second coupling latch are equipped with at least one engagement element into which a complementary engagement element that is or can be actively connected to a drive, can be inserted. With the aforementioned embodiment, both coupling latches or the closing flaps of both coupling latches of a docking device are rotated by way of a shared drive around a shared axis. Here, both closing flaps are subjected to a torque, preferably in the same manner. A differentiation in the active and passive flap is not possible with this embodiment. Accordingly, the partial shafts or partial shaft stumps of the first and second coupling latch can be pivoted around a shared axis to form a shaft or shaft stump in the bearings formed by semi-bearing seats of the first and second coupling latches. An embodiment of this type is also advantageously characterized by the fact that the engagement elements of the partial shafts or partial shaft stumps that form a shaft or shaft stump form a uniform engagement element for a corresponding engagement element of a drive shaft, in one embodiment in the form of a groove or a pin. The embodiment of a docking device described above preferably has at least one drive shaft, or a shaft that can preferably be actively connected to a drive, that is equipped with at least one engagement element that is complementary to at least one engagement element of the first or second coupling latch, in particular, to the uniform engagement element of the first and second coupling latches, so that when these engagement elements that are complementary to each other engage, the closing flaps that rest on each other can be pivoted by way of the drive.

Finally, the present disclosure illustrates and describes a centering pin for centering two coupling latches that form a docking device for refilling, filling, and/or emptying of containers, characterized by:

(a) at least one movable first arresting element that is present in a passage with an opening towards an outer side of the centering pin, in one embodiment in the form of a ball, that is configured for a form-fit, locking interaction with a corresponding arresting element, and (b) a bolt that is movable in a cylinder that is present in the centering pin wherein the bolt has a first section with a first diameter, a second section with a second diameter that is smaller than the diameter of the first section, and a third transfer section between the first and the second section with a tapering diameter. The passage opens out to the outer side and into the cylinder and is of a length that is less than the diameter of the first arresting element, so that when a side surface of the first section of the bolt is in contact with the movable first arresting element, the first arresting element can be partially pulled out of the opening. This centering pin is preferably a component of coupling latches, in one embodiment of butterfly valves, and as well as centering, the pin also serves to lock coupling latches in docking devices for environmentally insulated transfer of bulk goods.

The present disclosure is based on the surprising discovery that the two coupling latches that form a docking device can be locked in a particularly reliable and technically elegant and simple manner when, on the outer side of the coupling latches or the outer side of the pipe nozzles of these coupling latches, at least one, and in particular at least two, locking units as defined above are used. These locking units can simply be integrated into a docking platform or housing of such a docking platform, so that damage no longer occurs as a result of outer influences, such as during handling or when inserting the coupling latches into the docking platform. Additionally, the locking unit of the docking device according to the present disclosure requires fewer individual components, which also, even in continuous operation, are not exposed or subjected to any particular degree of wear, so that a low-maintenance and reliable operation can be provided.

DESCRIPTION OF THE DRAWINGS

Further advantages, features, and application opportunities of the present invention are explained in the following description of a preferred embodiment, with reference to the appended drawings, in which.

DETAILED DESCRIPTION

Figure 1:
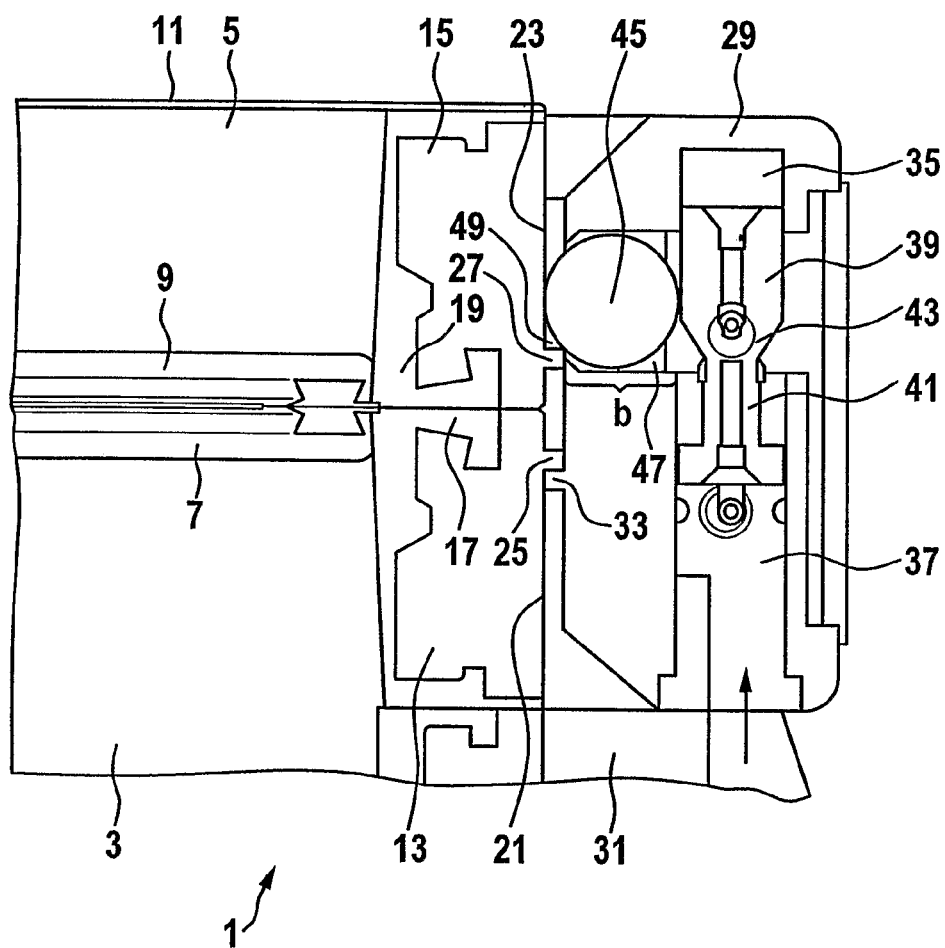
FIG. 1 shows a schematic cross-section drawing through a section of a docking device according to the present disclosure, containing a first embodiment of a locking unit.

FIG. 1 shows a schematic detail of a docking device 1, containing a first coupling latch 3 and a second coupling latch 5. The semi-flaps or closing flaps 7 and 9 of the first and second coupling latches 3 and 5 rest on each other while closing the transfer channel 11, which is formed by the two pipe nozzles 13 and 15 of the first and second coupling latches. The tightness of the docking device 1 when docked or coupled is guaranteed by the pipe nozzle seals 17 and 19 of the first and second coupling latches that rest on each other. On the outer sides 21 or 23 of the pipe nozzles 13, 15 of the first and second coupling latches 3 or 5, third and second holding or arresting elements 25 or 27 are provided. The locking unit 29 is in the embodiment shown a component of a docking working platform 31 for a docking device 1. The first and the second coupling latches can be inserted into the docking working platform 31, as is shown in FIG. 1. Here, the third arresting element 25 comes to rest on the outer side 21 of the pipe nozzle 13 of the first coupling latch 3 on a protrusion 33 (fourth arresting element) of the locking unit 29 or the docking working platform 31. In one embodiment, the third arresting element 25 can run around the full circumference of the pipe nozzle 13. In the same manner, the protrusion 33 can run around the circumference on the inner side of the docking working platform 31. Naturally, only two, four or more separate holding elements 25 (third arresting element) or protrusions 33 (fourth arresting element) which correspond to them can also be provided.

The locking unit 29 furthermore has a piston 37 that is movable in a cylinder 35, that has two sections 39 and 41 with a different diameter, and that are connected to each other via a transfer section 43 with a tapering diameter. Furthermore, the locking unit has a ball 45 (first arresting element) which is actively connected to the piston 37. This ball 45 is present in a channel 47 which extends to the side from the cylinder 35, which has an opening 49 on the side facing towards the outer side 23 of the pipe nozzle 15, which enables a partial but not complete outlet of the ball 45. The channel 47 in which the ball 45 is present has a width b that is smaller than the diameter of the ball, so that when the piston section 39 with the larger diameter is adjacent to the ball, the ball is partially pushed out of the opening 49 and held immovably in this position. In this position, the ball 45 interacts with the second arresting element 27 on the outer side 23 of the second coupling latch 5 with the result that the pipe nozzles 13 and 15 or the pipe nozzle end seals 17 and 19 are pressed against each other by the first and second coupling latches 3 and 5 and arrested. Only when the piston 37 is again moved upwards in the cylinder 35 (see arrow) is the ball 45 released for a movement in the channel or passage 47 in the direction of the cylinder 35, so that the second coupling latch 5 can be adopted by the first coupling latch 3. The piston 37 can, for example, be driven pneumatically.

Figure 2:
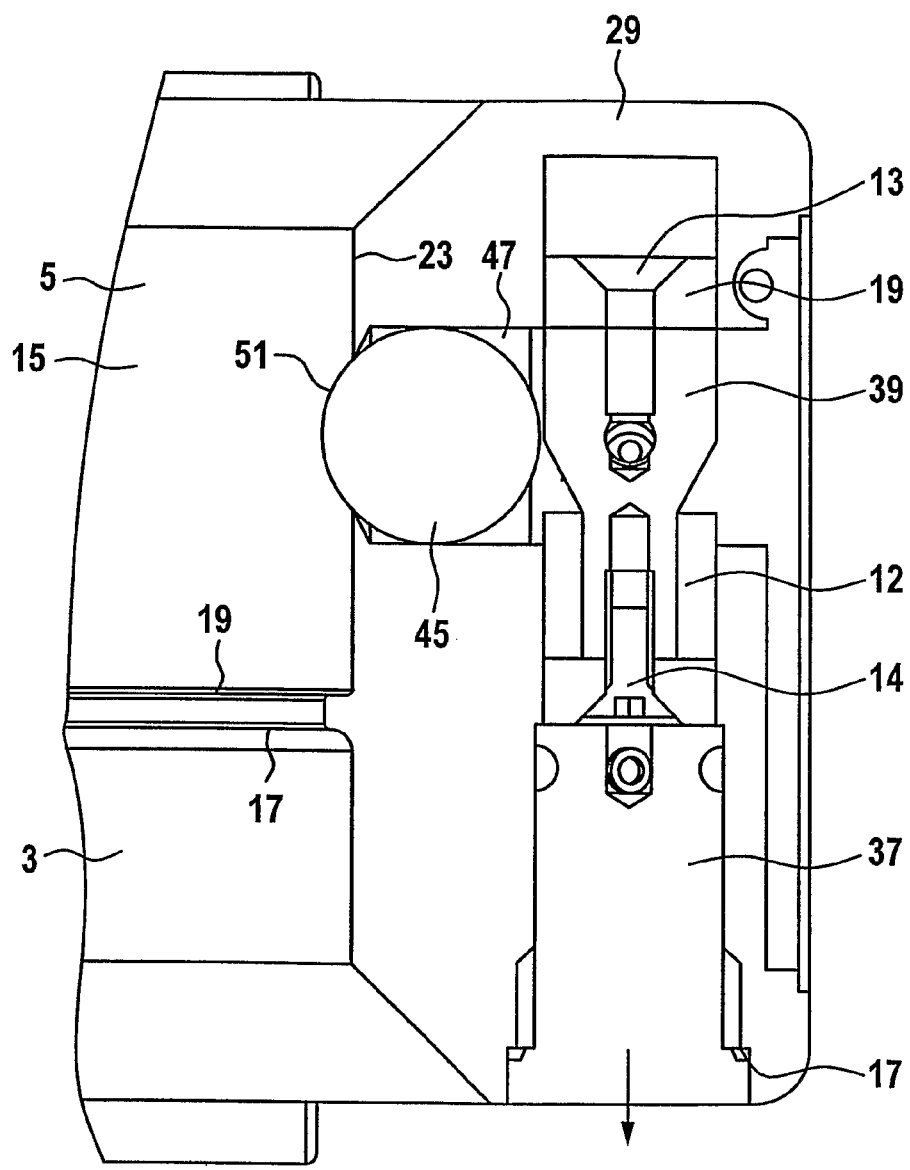
FIG. 2 shows a schematic cross-section through a section of the docking device according to the present disclosure, containing an alternative, second embodiment of a locking unit.

FIG. 2 shows an alternative embodiment of a locking unit 29. In contrast to the variant shown in FIG. 1, no arresting element is present in the form of a protrusion 27. To a far greater degree, the ball 45 grips in a recess 51 which is present in the outer wall 21 of the first coupling latch, which essentially adopts the form of the ball and accordingly has a similar or identical radius or curve. Due to the fact that when the piston 37 is moved downwards (see arrow), the ball is forced by the section 39 with the larger diameter out of the side channel 47, and an interaction occurs with the recess 51 on the outer side 23 of the pipe nozzle 15, which holds the pipe nozzles of the first and second coupling latch 3 and 5 or their pipe nozzle seals 17 and 19 pressed against each other. The lower holding or arresting element is not shown in the section shown in FIG. 2 of the docking device 1 but can, for example, be designed in precisely the same manner as that shown in FIG. 1.

The features disclosed in the above description, in the claims, and in the drawings can be essential both individually and in any combination required in order to realize the invention in its different embodiments.

The invention claimed is:

1. A docking device for refilling, filling, and/or emptying of containers, comprising:
   first and second coupling latches that can be laid or which lie flush with each other along respective latch sides, wherein each of the first and second coupling latches includes a pipe nozzle; and
   at least one locking unit configured for locking together the pipe nozzles of the first and second coupling latches, wherein the at least one locking unit includes:
      at least one movable first arresting element that is present in a passage that has an opening to an outer side of the second coupling latch, wherein the first arresting element is configured to interact with a corresponding second arresting element that is present on an outer side of the pipe nozzle of the second coupling latch, and
      a bolt that is movable in a cylinder, wherein the bolt has a first section with a first diameter, a second section with a second diameter that is smaller than the first diameter of the first section, and a third transfer section between the first and the second section with a tapering diameter,
   wherein the passage opens out to the outer side of the second coupling latch and into the cylinder and is of a length that is less than a diameter of the first arresting element, so that when a side surface of the first section of the bolt is in contact with the movable first arresting element, the movable first arresting element interacts with the corresponding second arresting element on the outer side of the pipe nozzle of the second coupling latch and locks the first and second coupling latches together, and when the movable first arresting element is adjacent to a side surface of the second or third section of the bolt, the pipe nozzles of the first and second coupling latches are no longer lockable or are not locked against each other.

2. The docking device according to claim 1, wherein the first and the second coupling latches are in each case equipped with a latch side and a container side, and in each case the first and second coupling latches further comprise a closing flap that is supported around an axis in said pipe nozzle in such a manner that the closing flap is pivotable about the axis, the closing flap containing an outer side which faces the latch side in a closed position, wherein on at least one side along the axis, the closing flap has a partial shaft or partial shaft stump in an open position facing the latch side,
   wherein the partial shaft or partial shaft stump of the first coupling latch is configured to form a shaft or a shaft stump when in contact with a complementary partial shaft or partial shaft stump of the second coupling latch, and
   wherein the outer sides of the closing flaps of the first and second coupling latches rest on each other or can be brought to rest on each other, and, when resting on each other, the closing flaps can be reversibly pivoted around a shared axis between an open position and the closed position in which the closing flaps close the transfer channel that is formed by the pipe nozzle of the first coupling latch and the pipe nozzle of the second coupling latch.

3. A docking device for refilling, filling, and/or emptying of containers, comprising:
   first and second coupling latches that can be laid or which lie flush with each other along respective latch sides, wherein each of the first and second coupling latches includes a pipe nozzle; and
   at least one locking unit configured for reversible locking of said first and second coupling latches,
   wherein the first or second coupling latch has at least one centering pin, and the other of the second or first coupling latch has at least one centering opening that corresponds to the centering pin, which, when they grip each other, centers the first and second coupling latches in a coupled state,
   wherein the at least one locking unit is configured for locking together the pipe nozzles of the first and second coupling latches, the at least one locking unit comprising:
      at least one first movable arresting element that is present in a passage that has an opening towards an outer side of the centering pin, wherein the first arresting element is configured for locking interaction with the centering opening, and
      a bolt that is movable at least in sections in a cylinder present in the centering pin, wherein the bolt has a first section with a first diameter, a second section with a second diameter that is smaller than the diameter of the first section, and a third transfer section between the first and the second section with a tapering diameter,
   wherein the passage opens out to the outer side of the centering pin and into the cylinder and is of a length that is less than a diameter of the first arresting element, so that when a side surface of the first section of the bolt is in contact with the movable first arresting element, the first arresting element interacts with the centering opening and locks the first and second coupling latches together, and when the movable first arresting element is adjacent to a side surface of the second or third section of the bolt, the pipe nozzles of the first and second coupling latches are no longer lockable or are not locked to each other.

4. The docking device according to claim 3, wherein the first and second coupling latches are in each case equipped with a latch side and a container side, and in each case the first and second coupling latches comprise a closing flap that is supported around an axis in said pipe nozzle in such a manner that the closing flap is pivotable about the axis, the closing flap containing an outer side which faces the latch side in a closed position, wherein on at least one side along the axis, the closing flap has a partial shaft or partial shaft stump in an open position facing the latch side,
   wherein the partial shaft or partial shaft stump of the first coupling latch is configured to form a shaft or a shaft stump when in contact with a complementary partial shaft or partial shaft stump of the second coupling latch, and
   wherein the outer sides of the closing flaps of the first and second coupling latches rest on each other or can be brought to rest on each other, and when resting on each other, the closing flaps can be reversibly pivoted around a shared axis between an open position and the closed position in which the closing flaps close the transfer channel that is formed by the pipe nozzle of the first coupling latch and the pipe nozzle of the second coupling latch.

5. The docking device according to claim 2 or claim 4, wherein the partial shafts or partial shaft stumps of the first and the second coupling latches are equipped with at least one engagement element into which a complementary engagement element, which is or can be actively connected to a drive, can be inserted.

6. The docking device according to claim 5, wherein the partial shafts or partial shaft stumps of the first and second coupling latches can be pivoted around the shared axis to form the shaft or shaft stump in the bearings formed by semi-bearing seats of the first and second coupling latches.

7. The docking device according to claim 5, wherein the engagement elements of the partial shafts or partial shaft stumps which form the shaft or shaft stump form a uniform engagement element for a corresponding engagement element of a drive shaft.

8. The docking device according to claim 5, further comprising at least one drive shaft, or a shaft that can be actively connected to the drive, which is equipped with at least one engagement element that is complementary to the at least one engagement element of the first or second coupling latches so that when these engagement elements which are complementary to each other engage, the closing flaps which rest on each other can be pivoted by the drive.

9. The docking device according to claim 3, wherein when the side surface of the first section of the bolt is in contact with the movable first arresting element, the first arresting element interacts with the centering opening of the second coupling latch in such a manner while locking the first and second coupling latch that the first arresting element interacts with a corresponding second arresting element which is present in and/or on a wall of the centering opening of the second coupling latch, locking together the first and the second coupling latches.

10. The docking device according to claim 1 or claim 3, wherein the docking device has two or more locking units.

11. The docking device according to claim 10, wherein two locking units are arranged essentially opposite each other with respect to the first and second coupling latches.

12. The docking device according to claim 1 or claim 3, wherein the locking unit comprises a ball locking bolt device.

13. The docking device according to claim 1 or claim 3, wherein the first coupling latch includes an active closing flap and the second coupling latch includes a passive closing flap.

14. The docking device according to claim 1 or claim 3, wherein the opening of the passage is dimensioned such that the first arresting element can only be partially pushed out of said opening.

15. The docking device according to claim 1 or claim 3, further comprising a docking platform that is configured to hold the first coupling latch.

16. The docking device according to claim 15, wherein the docking platform comprises at least partially the at least one locking unit.

17. The docking device according to claim 1 or claim 3, wherein the pipe nozzle of the first coupling latch is equipped on its outer side with a third arresting element configured to rest or interact with a fourth arresting element of the locking unit or of a docking platform.

* * * * *